US009599196B2

(12) United States Patent
Beck et al.

(10) Patent No.: US 9,599,196 B2
(45) Date of Patent: Mar. 21, 2017

(54) TRANSMISSION FOR A MOTOR VEHICLE (71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 96 days.

(21) Appl. No.: 14/646,621

(22) PCT Filed: Oct. 24, 2013

(86) PCT No.: PCT/EP2013/072228
§ 371 (c)(1),
(2) Date: May 21, 2015

(87) PCT Pub. No.: WO2014/079644
PCT Pub. Date: May 30, 2014

(65) Prior Publication Data
US 2015/0285342 A1    Oct. 8, 2015

(30) Foreign Application Priority Data

Nov. 21, 2012  (DE) .................. 10 2012 221 234

(51) Int. Cl.
*F16H 3/44* (2006.01)
*F16H 3/62* (2006.01)
*F16H 3/66* (2006.01)

(52) U.S. Cl.
CPC ......... *F16H 3/66* (2013.01); *F16H 2003/442* (2013.01); *F16H 2200/0008* (2013.01);
(Continued)

(58) Field of Classification Search
CPC ................... F16H 2200/201; F16H 2200/2046
See application file for complete search history.

(56) References Cited

U.S. PATENT DOCUMENTS 7,118,508 B2   10/2006  Usoro et al.
7,828,688 B2   11/2010  Phillips et al.
(Continued)

FOREIGN PATENT DOCUMENTS

DE    102012224118 A1 *  6/2014  ............... F16H 3/66
JP        201003833         2/2010

OTHER PUBLICATIONS

PCT Search Report, Jan. 28, 2014.
German Search Report, Jul. 16, 2013.

*Primary Examiner* — Tisha Lewis
(74) *Attorney, Agent, or Firm* — Dority & Manning, P.A.

(57) ABSTRACT

A transmission includes a drive shaft (1), an output shaft (2), a housing (G), a first planetary gear set (PR1), a second planetary gear set (PR2) and a third planetary gear set (PR3), and six shift elements, including a first brake (B1), a second brake (B2) along with a first clutch (K1), a second clutch (K2), a third clutch (K3, K3', K3", K3''') and a fourth clutch (K4, K4'). The shift elements are selectively actuated, by which nine forward gears and one reverse gear can be realized through different transmission ratios between the drive shaft (1) and the output shaft (2). Each planetary gear set (PR1, PR2, PR3) has a sun gear (S1, S2, S3), one planetary gear, one planetary carrier (PT1, PT2, PT3) and one ring gear (H1, H2, H3). The drive shaft (1) and the output shaft (2) are arranged in a manner axially offset to each other, and the drive shaft is (1), through the second clutch (K2), connectable to the ring gear (H2) of the second planetary gear set (PR2) and the sun gear (S3) of the third planetary gear set (PR3). The drive shaft (1) is, through the first clutch (K1), connectable to the second brake (B2) and the sun gear (S2) of the second planetary gear set (PR2). The sun gear (S2) of the second planetary gear set (PR2) and the second brake (B2) are also connected to each other.

14 Claims, 6 Drawing Sheets (52) U.S. Cl.
CPC ............... *F16H 2200/0065* (2013.01); *F16H 2200/201* (2013.01); *F16H 2200/2046* (2013.01)

(56) References Cited

U.S. PATENT DOCUMENTS

| | | |
|---|---|---|
| 2009/0305837 A1 | 12/2009 | Hiraiwa |
| 2010/0035718 A1 | 2/2010 | Saitoh |
| 2016/0131226 A1* | 5/2016 | Beck .......................... F16H 3/66 475/275 |

* cited by examiner

| (gear) | (engaged shifting elements) | | | | | | (ratio) | (step) |
|---|---|---|---|---|---|---|---|---|
| | (brake) | | (clutch) | | | | | |
| | B1 | B2 | K1 | K2 | K3 | K4 | i | φ |
| 1 | × | | | × | | × | 4,348 | |
| 2 | | × | | × | | × | 2,545 | 1,709 |
| 3 | | | × | × | | × | 1,667 | 1,527 |
| 4 | | | | × | × | × | 1,267 | 1,316 |
| 5 | | × | | × | × | | 1,000 | 1,267 |
| 6 | | × | | × | × | | 0,813 | 1,230 |
| 7 | × | | | × | × | | 0,709 | 1,147 |
| 8 | × | × | | | × | | 0,600 | 1,181 |
| 9 | × | | × | | × | | 0,502 | 1,195 |
| R | × | | × | | | × | -3,423 | (total) 8,668 |
| 4-I | | × | | | × | × | 1,267 | |
| 4-II | × | | | | × | × | 1,267 | |
| 4-III | | | × | | × | × | 1,267 | |

Fig. 6

TRANSMISSION FOR A MOTOR VEHICLE

FIELD OF THE INVENTION

The present invention relates to a transmission, in particular for use in motor vehicles.

BACKGROUND

Here, a transmission in particular designates a multi-gear transmission, with which a predefined number of gears, thus fixed transmission ratios between transmission input and transmission output, is automatically shiftable through shift elements. Here, the shift elements comprise, for example, clutches or brakes.

DE 10 2008 032 015 discloses a powershift transmission with ten forward gears and one reverse gear. Thereby, the powershift transmission features three planetary gear sets, which are able to be shifted with each other in various combinations through six torque-transferring devices, two of which are fixed connections and four of which are clutches. A torque is initiated through a start-up element in the powershift transmission, and is transferred to an output element while taking into account the respective transmission ratio. Thereby, the drive element and the output element are arranged coaxially to each other.

SUMMARY OF THE INVENTION

The present invention is subject to a task of proposing a transmission of the aforementioned type, which features small gear steps with a large gear spread, which at the same type optimizes installation space and/or has a high degree of efficiency. Additional objects and advantages of the invention will be set forth in part in the following description, or may be obvious from the description, or may be learned through practice of the invention.

A "gear spread" is understood to mean the quotient from the transmission ratio of the lowest gear and the transmission ratio of the highest gear, whereas the lowest gear has the largest transmission ratio, and the highest gear has the smallest transmission ratio. If there is a transmission ratio of i<1.0, a transmission into fast mode takes place; that is, at the transmission output, a higher rotational speed than that at the transmission input is applied.

A transmission input thereby describes a location on a transmission at which, in driving mode, a torque is initiated by the drive source in the transmission. In contrast to this, a "transmission output" is understood to mean a location on the transmission at which the torque, taking into account the corresponding transmission ratios (for example, in a transfer case) is initiated or transferred to the drive shafts of the vehicle.

In accordance with the invention, this task is solved with a transmission as described and claimed herein.

The transmission comprises a drive shaft, an output shaft, a housing, a first planetary gear set, a second planetary gear set and a third planetary gear set, along with six shift elements. It is particularly preferable that, through the drive shaft, a torque or a rotational movement of a drive source, such as an internal combustion engine, is initiated in the transmission. In a preferred manner, a start-up element, such as a hydrodynamic torque converter or a fluid coupling, is located between the drive source and the drive shaft.

In the following, a "shaft" is not solely understood as an exemplary cylindrical, rotatably mounted machine element for the transfer of torques, but is also understood as a general connection element, which connects individual components or elements to each other, in particular connection elements that connect several elements to each other in a torque-proof manner.

In particular, two elements are described as connected to each other if there is a fixed (in particular, a torque-proof) connection between the elements. In particular, such connected elements rotate with the same rotational speed.

Furthermore, two elements are described as connectable if there is a detachable connection between such elements. In particular, such elements rotate with the same rotational speed if the connection exists.

The various components and elements of the specified invention may be connected to each other through a shaft or a connection element, or also directly, for example by means of a welded connection, crimping connection or another connection.

It is particularly preferable that the six shift elements comprise a first brake, a second brake, a first clutch, a second clutch, a third clutch and a fourth clutch.

Thereby, clutches describe shift elements that, depending on their operating state, allow for a relative movement between two components or represent a connection for the transfer of a torque. A "relative motion" is understood as, for example, a rotation of two components, where the rotational speed of the first component and the rotational speed of the second component differ from each other. In addition, the rotation of only one of the two components is conceivable, while the other component is at a standstill or rotates in the opposite direction.

In the following, a "non-actuated clutch" is understood as an open clutch. This means that a relative motion between the two components is possible. With an actuated or locked clutch, the two components rotate accordingly with the same rotational speed and in the same direction.

A "brake" is understood as a shift element that is connected on one side to a fixed element, such as a housing, and on another side to a rotating element. In the following, a "non-actuated brake" is understood as an open brake. This means that the rotating component is freely rotating, which means that the brake preferably does not affect the rotational speed of the rotating component. With an actuated or locked brake, a reduction in the rotational speed of the rotating component takes place up to a stop, which means that a fixed connection between the rotating element and the fixed element can be established. In this context, "element" and "component" are equated.

As a general rule, the use of shift elements that are locked in a non-actuated state and open in an actuated state is also possible. Accordingly, the allocations between function and shifting state of the shifting states described above are understood in reverse order. With the following embodiments, an arrangement in which an actuated shift element is closed and a non-actuated shift element is open is initially used as the basis.

A planetary gear set comprises a sun gear, a planetary carrier and a ring gear. Planetary gears that mesh with the toothing of the sun gear and/or with the toothing of the ring gear are rotatably mounted on the planetary carrier.

In the following, a negative planetary gear set describes a planetary gear set with a planetary carrier on which the planetary gears are rotatably mounted, with one sun gear and one ring gear, whereas the toothing of at least one of the planetary gears meshes with both the toothing of the sun gear and with the toothing of the ring gear, by which the ring gear and the sun gear rotate in opposite directions, if the sun gear rotates with a fixed planetary carrier.

A positive planetary gear set differs from the negative planetary gear set just described in that the positive planetary gear set features inner and outer planetary gears, which are rotatably mounted on the planetary carrier. Thereby, the toothing of the inner planetary gears meshes, on the one hand, with the toothing of the sun gear and, on the other hand, with the toothing of the outer planetary gears. The toothing of the outer planetary gears also meshes with the toothing of the ring gear. This has the consequence that, with a fixed planetary carrier, the ring gear and the sun gear rotate in the same direction of rotation.

A particularly compact transmission can be realized through the use of planetary gear sets, by which a high degree of freedom in the arrangement of the transmission in the vehicle is achieved.

In particular, the sun gear, the ring gear, the planetary carrier and the planetary gears of the planetary gear set are understood as elements of a planetary gear set.

It is particularly preferable that the shift elements are able to be actuated selectively, thus individually and in line with demand, by which nine forward gears and one reverse gear can be realized through different transmission ratios between the drive shaft and the output shaft. Based on the numerous gears, it is possible to realize a fine gear shifting with a large gear spread, and thereby, for example, to operate the internal combustion engine in an optimal rotational speed range, and thus efficiently. At the same time, this contributes to increased driving comfort, since the internal combustion engine preferably can be operated at a low rotational speed level. Thus, for example, noise emissions that arise through the operation of the internal combustion engine are reduced.

It is also preferable that the drive shaft and the output shaft are arranged in a manner axially offset to each other. This leads, for example, to a particularly low need for axial installation space for the transmission. Thereby, the transmission is suitable, in a particularly preferable manner, for use in a vehicle with a front-transverse arrangement of the drive train.

"Front-transverse arrangement of the drive train" is understood to mean that the drive source, such as an internal combustion engine, is installed in the vehicle transverse to the direction of travel, and that, preferably, the wheels of the front axle are drivable by the drive source or the transmission.

It is particularly preferable that all elements of the first planetary gear set, the second planetary gear set and the third planetary gear set are rotatable. This means that there is no permanent connection between the elements of the planetary gear sets and a fixed element, such as the housing; rather, a connection can be selectively established through the actuation of the shift elements. This also advantageously contributes to the fact that, by means of a low number of planetary gear sets, a high number of gears can be realized. Thereby, a blocking of the individual elements of the planetary gear sets can be produced only through the actuation of the respective shift elements.

It is also preferable that the drive shaft is, through the second clutch, connectable to the ring gear of the second planetary gear set and the sun gear of the third planetary gear set. Thereby, the ring gear of the second planetary gear set and the sun gear of the third planetary gear set are also connected to each other. In this case, for example, the ring gear of the second planetary gear set possesses, in addition to an inner toothing, which meshes with the toothing of the planetary gears of the second planetary gear set, an outer toothing, which preferably assumes the function of the toothing of the sun gear of the third planetary gear set. Thereby, the outer toothing of the ring gear of the second planetary gear set meshes with the toothing of the planetary gears of the third planetary gear set. Preferably, the drive shaft is, through the first clutch, connected to the second brake and the sun gear of the second planetary gear set, whereas the second brake and the sun gear of the second planetary gear set preferably are also connected to each other. This achieves a multitude of degrees of freedom with respect to the planetary gear sets, such that a multitude of gears with the use of relatively few shift elements and planetary gear sets is feasible.

The degree of efficiency of the transmission may be preferably increased by the fact that, for the shift elements, energy is necessary for the change to the shifting state, but not for maintaining the shifting state itself. Here, actuated shift elements in line with demand, such as electromechanical shift elements or electromagnetic shift elements, are suitable in a particular way. Particularly when compared to conventional hydraulically actuated shift elements, they are characterized by a particularly low and efficient energy demand, since they can be operated nearly loss-free. In addition, with the solution specified above, it is advantageous that permanently holding a control pressure for the actuation of the (for example) conventional hydraulic shift elements, and/or permanently applying the shift element in the locked state with the required hydraulic pressure, can be avoided. Thereby, additional components such as a hydraulic pump (for example) may be omitted, to the extent that they are solely used for the control and supply of conventional hydraulically actuated shift elements. If the additional components are supplied with lubricant by the same hydraulic pump, and not by a separate lubrication pump, at least this can be dimensioned smaller. Moreover, any leaks at the oil transfer points of the hydraulic circuit that may arise, particularly with rotating components, are eliminated. It is particularly preferable that this also contributes to increased efficiency of the transmission in the form of a higher degree of efficiency. Upon the use of actuated shift elements in line with demand of the type specified above, it is particularly advantageous if they are easily accessible from the outside. Among other things, that has the advantage that the required shifting energy can be easily fed to the shift elements. Therefore, the shift elements are, particularly preferably, arranged so that they are easily accessible from the outside. Within the meaning of the shift elements, "easily accessible from the outside" means that no additional components are arranged between the housing and the shift element, and/or that the shift elements are, particularly preferably, arranged on the output shaft or on the drive shaft.

In an additional preferred form of the arrangement, the ring gear of the third planetary gear set is connected to the first brake.

In an additional, particularly preferable form of the arrangement, the transmission features a first spur pinion and a second spur pinion. By means of the first spur pinion and/or the second spur pinion, a torque is transferable between the drive shaft and the output shaft, depending on the actuation of the shift elements. Through this arrangement, the transmission is suitable, in a particularly preferable manner, for use in vehicles with a front-transverse arrangement of the drive train, since a lower need for axial installation space is required by the axially offset arrangement of the drive shaft and the output shaft. This is of particular importance for vehicles with a front-transverse arrangement of the drive train, since the available installation space for the drive source and the transmission is, in a particular manner, limited by the width of the vehicle.

However, other arrangements of the drive train (for example, for rear-wheel drive vehicles and/or for vehicles with a longitudinal arrangement of the drive train. For a vehicle with a longitudinal arrangement of the drive train, the drive source, such as an internal combustion engine, is preferably installed in the vehicle longitudinally to the direction of travel, and the wheels of the rear axle are preferably drivable by the drive source or the transmission.

A spur pinion comprises a single-stage or multi-stage spur gearbox with at least two spur gears, which mesh with each other. Thereby, the respective shafts of the spur gears and/or the rotation axes of the shafts and spur gears are arranged parallel to each other.

In an additional preferred form of the arrangement, the two spur pinions are arranged in an axial alignment along the drive shaft, particularly preferably between the first planetary gear set and the second planetary gear set, in the order of first planetary gear set, first spur pinion, second spur pinion, third planetary gear set. This arrangement ensures a particularly space-saving design, since the individual planetary gear sets and shift elements can be easily nested in one another, and the various shafts, for example with this arrangement, do not cross each other.

To the extent that this allows for the binding ability of the elements, a geometric positioning of the individual gear sets, shift elements and spur pinions that deviates from the arrangement just described is conceivable, to the extent that the change to the geometric positioning of the components occurs along the drive shaft.

The first planetary gear set, the second planetary gear set and the third planetary gear set are preferably arranged coaxially to the drive shaft. In addition, at least one spur gear of the first spur pinion and one spur gear of the second spur pinion are arranged coaxially to the drive shaft.

"Binding ability" is understood to mean that, with a different geometric positioning, thus an arrangement of components that deviates from the arrangement just described, the same binding or connection of the interfaces is ensured, without the individual connection elements or shafts crossing each other.

Moreover, the use of a chain drive or a belt drive in place of the first spur pinion and/or the second spur pinion is conceivable.

In a particularly preferred form of the arrangement, the second planetary gear set and the third planetary gear set are axially positioned with respect to the drive shaft such that the third planetary gear set is arranged radially over the second planetary gear set. The arrangement of the third planetary gear set radially over the second planetary gear set is characterized, in a particular manner, by a particularly low need for axial installation space. It is particularly preferable that the ring gear of the second planetary gear set and the sun gear of the third planetary gear set are connected to each other. As an alternative to this, a one-piece or a single-part version of the sun gear of the third planetary gear set and the ring gear of the second planetary gear set is conceivable. In this case, for example, the ring gear of the second planetary gear set possesses, in addition to an inner toothing, which meshes with the toothing of the planetary gears of the second planetary gear set, an outer toothing, which preferably assumes the function of the toothing of the sun gear of the third planetary gear set. Thereby, the outer toothing of the ring gear of the second planetary gear set meshes with the toothing of the planetary gears of the third planetary gear set. In addition, this arrangement enables the use of the outer radius of the ring gear of the third planetary carrier as a multi-disk carrier at the same time, which is in mesh with, for example, the first brake. This has the particularly advantageous result that no additional connection element is necessary between the ring gear of the third planetary gear set and the first brake, by which an additional angle plate is rendered unnecessary (for example), and installation space can thus be optimized. Moreover, the assembly process is simplified by eliminating possible components.

In an additional preferred embodiment, the first clutch and the second clutch are each connected to the drive shaft on their sides. Thereby, it is particularly advantageous that the first clutch and the second clutch are easily accessible from the outside.

In an additional preferred variant of the transmission, the first planetary gear set, the second planetary gear set and the third planetary gear set are each designed as a negative planetary gear set. In a particular manner, this arrangement proves to be a cost-effective option for realization. At the same time, this arrangement has a high degree of efficiency with respect to the gear set, since, compared to positive planetary gear sets, negative planetary gear sets have an improved degree of efficiency.

To the extent allowed by the binding ability, as an alternative embodiment, at least one negative planetary gear set may be converted into a positive planetary gear set. However, at the same time, this requires that the planetary carrier connection and the ring gear connection are exchanged, and the amount of the stationary transmission ratio is increased by the value of 1.

Thereby, the stationary transmission ratio indicates the transmission ratio between the sun gear and the ring gear, if the planetary carrier is fixed.

In an additional preferred form of the arrangement, the drive shaft is connectable to the planetary carrier of the first planetary gear set through the third clutch. The sun gear of the first planetary gear set is preferably connected to a second spur pinion and the planetary carrier of the third planetary gear set. The second spur pinion is preferably further connectable to the output shaft through the fourth clutch, and the planetary carrier of the third planetary gear set is preferably further connected to the planetary carrier of the second planetary gear set. Preferably, the ring gear of the first planetary gear set is connected to a first spur pinion, and the first spur pinion is further connected to the output shaft.

In an additional preferred embodiment, the drive shaft is connected to the planetary carrier of the first planetary gear set. It is also preferable that the sun gear of the first planetary gear set is connectable to a second spur pinion and the planetary carrier of the third planetary gear set through the third clutch. The second spur pinion is preferably further connectable to the output shaft through the fourth clutch, and the planetary carrier of the third planetary gear set is further connected to the planetary carrier of the second planetary gear set. Preferably, the ring gear of the first planetary gear set is connected to a first spur pinion, and the first spur pinion is preferably further connected to the output shaft.

In an additional preferred variant of the transmission, the drive shaft is connected to the planetary carrier of the first planetary gear set. The sun gear of the first planetary gear set is preferably further connected to a second spur pinion and the planetary carrier of the third planetary gear set, whereas the second spur pinion is preferably further connectable to the output shaft through the fourth clutch. It is also preferable that the planetary carrier of the third planetary gear set is connected to the planetary carrier of the second planetary gear set. The ring gear of the first planetary gear set is preferably connectable to a first spur pinion through the third clutch. The first spur pinion is preferably further connected to the output shaft.

In an additional preferred form of the arrangement, the drive shaft is connected to the planetary carrier of the first gear set. The sun gear of the first planetary gear set is preferably connected to a second spur pinion and the planetary carrier of the third planetary gear set. The second spur pinion is preferably further connectable to the drive shaft through the fourth clutch, and the planetary carrier of the third planetary gear set is preferably further connected to the planetary carrier of the second planetary gear set. Preferably, the ring gear of the first planetary gear set is connected to a first spur pinion, and the first spur pinion is further connectable to the output shaft through the third clutch.

In an additional preferred embodiment, the drive shaft is connectable to the planetary carrier of the first planetary gear set through the third clutch. It is also preferable that the sun gear of the first planetary gear set is connected to the planetary carrier of the third planetary gear set. Preferably, the sun gear of the first planetary gear set is connectable to a second spur pinion through the fourth clutch, whereas the second spur pinion is preferably further connected to the output shaft. Preferably, the planetary carrier of the third planetary gear set is connected to the planetary carrier of the second planetary gear set. It is also preferable that the ring gear of the first planetary gear set is connected to a first spur pinion, and the first spur pinion is further connected to the output shaft.

In a particularly preferable form of the arrangement, the first forward gear preferably can be represented by the locked first brake, the locked second clutch and the locked fourth clutch. The second forward gear can preferably be represented by the locked second brake, the locked second clutch and the locked fourth clutch. The third forward gear preferably can be represented by the locked first clutch, the locked second clutch and the locked fourth clutch. The fourth forward gear preferably can be represented by the locked second clutch, the locked third clutch and the locked fourth clutch or by the locked second brake, the locked third clutch and the locked fourth clutch or by the locked first brake, the locked third clutch and the locked fourth clutch or by the locked first clutch, the locked third clutch and the locked fourth clutch. The fifth forward gear preferably can be represented by the locked first clutch, the locked second clutch and the locked third clutch. The sixth forward gear can preferably be represented by the locked second brake, the locked second clutch and the locked third clutch. The seventh forward gear preferably can be represented by the locked first brake, the locked second clutch and the locked third clutch. The eighth forward gear preferably can be represented by the locked first brake, the locked second brake and the locked third clutch. The ninth forward gear preferably can be represented by the locked first brake, the locked first clutch and the locked third clutch. The reverse gear preferably can be represented by the locked first brake, the locked first clutch and the locked fourth clutch.

Preferably, each of the shift elements that is not specified is open in the respective corresponding gear.

In accordance with an additional aspect of the present invention, a method for operating the transmission is proposed. Thereby, at least nine forward gears can preferably be selected in such a manner that, in each gear, three shift elements are locked and the remaining shift elements are open. A gear change to an adjacent higher gear or to an adjacent lower gear can preferably be realized by closing at least one previously open shift element and by opening at least one previously locked shift element. It is particularly preferable that this contributes to a reduction in shifting times. Regardless of whether they are able to be actuated hydraulically, electro-mechanically or in any other way, this leads to a lower need for energy by the shift elements, which ultimately has advantageous effects on consumption, for example the fuel consumption of the vehicle if an internal combustion engine is the drive source.

In principle, all shift elements can function in a frictional-locking or positive-locking manner. It is particularly preferable that the second clutch and the fourth clutch are designed as positive-locking shift elements, in particular as claw couplings. This leads to a significantly improved degree of efficiency of the transmission, and thus to significant consumption advantages with respect to fuel consumption, for example, for vehicles with internal combustion engines.

In principle, on each shaft or each connection element, an electric motor or another power/drive source may also be arranged.

In addition, at each shaft or each connection element, a freewheel may in principle be arranged at the housing or at another shaft. As a result, the corresponding shift element may be dimensioned smaller, since at least part of the torque is captured through the freewheel.

BRIEF DESCRIPTION OF THE DRAWINGS

The invention is described more specifically by example on the basis of the attached figures. The following is shown.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
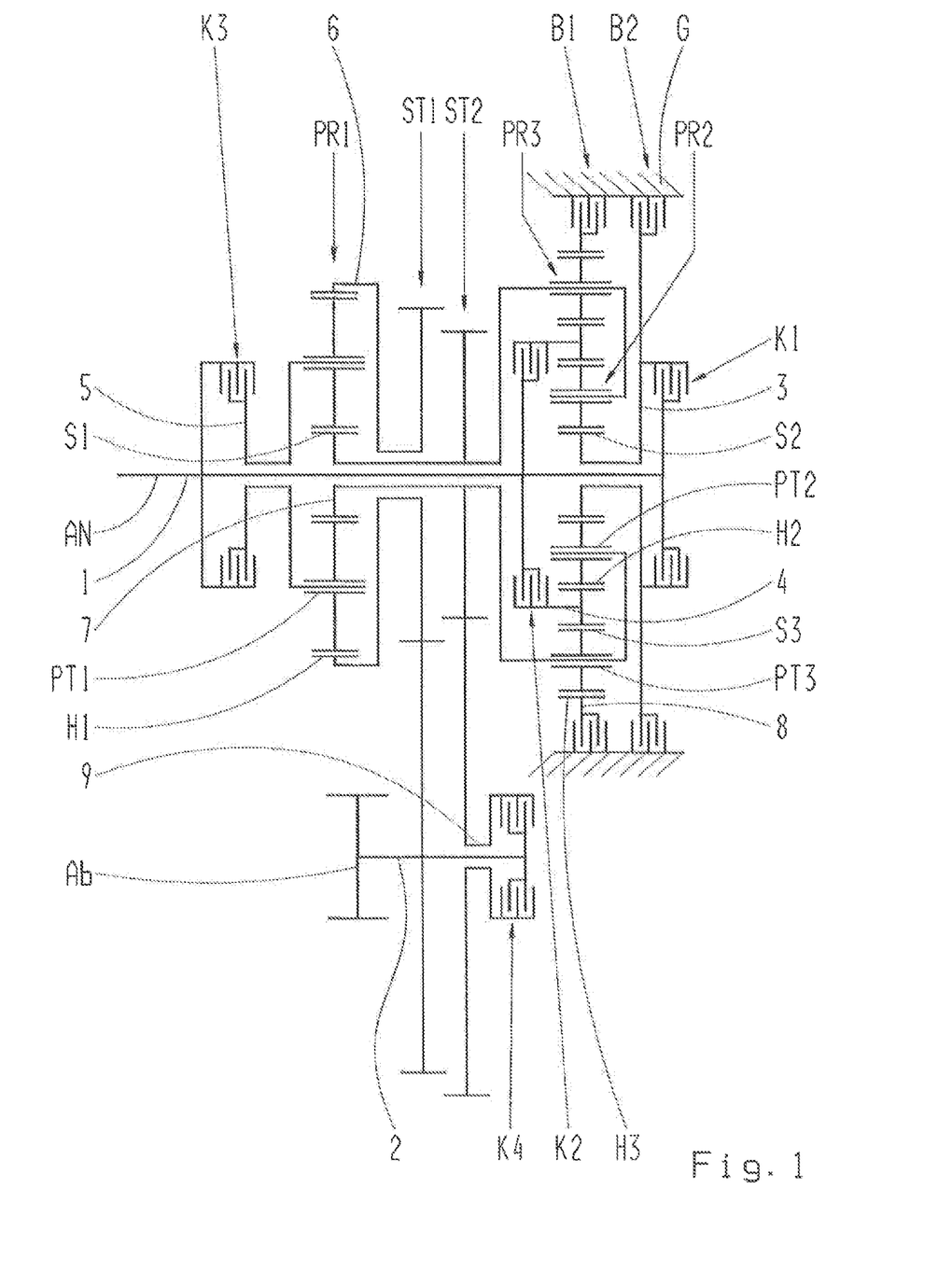
FIG. 1 is a schematic view of a first preferred embodiment of a transmission in accordance with the invention.

In a schematic presentation, FIG. 1 shows a first preferred embodiment of the transmission, whereas the transmission comprises a first planetary gear set PR1, a second planetary gear set PR2, a third planetary gear set PR3, a first spur pinion ST1, a second spur pinion ST2 and six shift elements. All of the specified elements are arranged in a housing G. The six shift elements comprise a first brake B1, a second brake B2, a first clutch K1, a second clutch K2, a third clutch K3 and a fourth clutch K4. The first brake B1 and the second brake B2 are each connected on one side to the housing G. FIG. 1 also shows a drive shaft 1 and an output shaft 2, whereas the drive shaft 1 and the output shaft 2 are arranged parallel to each other. On a first side of the drive shaft 1, the drive shaft 1 has a free end. On this first side of the drive shaft 1, a rotational movement or a torque is initiated in the transmission. On a side opposite to the first side of the transmission shaft 1, the drive shaft 1 is connected to the first clutch K1. Spatially, between the free end of the drive shaft 1 of the first clutch K1, the third clutch K3, the first planetary gear set PR1, the first spur pinion ST1, the second spur pinion ST2 and the second clutch K2 are arranged in the specified order along the drive shaft 1. In addition, the second planetary gear set PR2, the third planetary gear set PR3, the first brake B1 and the second brake B2 are located between the second clutch K2 and the first clutch K1 in a spatial arrangement along the drive shaft 1. Thereby, the third planetary gear set PR3 is arranged radially over the second planetary gear set PR2. This means that the ring gear H2 of the second planetary gear set PR2 is connected to the sun gear S3 of the third planetary gear set PR3. The first brake B1 is arranged radially above the third planetary gear set PR3 or the ring gear H3 of the third planetary gear set PR3. The first clutch K1, the first brake B1, the second brake B2, the second clutch K2, the third clutch K3, the first planetary gear set PR1, the second planetary gear set PR2 and the third planetary gear set PR3 are thereby arranged coaxially to the drive shaft 1. At least one spur gear of the first spur pinion ST1 and at least one spur gear of the second spur pinion ST2 are thereby also coaxially arranged to the drive shaft 1. The output shaft 2 also has a free end on a first side. Thereby, the free end of the output shaft 2 and the free end of the drive shaft 1 point in the same direction. Along the output shaft 2, the first spur pinion ST1, the second spur pinion ST2 and the fourth clutch K4 are arranged in the specified order, beginning on the free end of the output shaft 2. Thereby, the fourth clutch K4 is arranged coaxially to the output shaft 2. At least one spur gear of the first spur pinion ST1 and one spur gear of the second spur pinion ST2 are also arranged coaxially to the output shaft 2.

The drive shaft 1 is connectable to the third shaft 3 through the first clutch K1, whereas the third shaft 3 is further connected to the second brake B2 and the sun gear S2 of the second planetary gear set PR2. In addition, the third shaft 3 connects the second brake B2 and the sun gear S2 of the second planetary gear set PR2. Further, the drive shaft 1 is connectable to a fourth shaft 4 through the second clutch K2, whereas the fourth shaft 4 is further connected to the ring gear H2 of the second planetary gear set PR2 and the sun gear S3 of the third planetary gear set PR3. In addition, the drive shaft 1 is connectable to a fifth shaft 5 through the third clutch K3. The fifth shaft 5 is further connected to the planetary carrier PT1 of the first planetary gear set PR1. The sun gear S1 of the first planetary gear set PR1 is connected to a seventh shaft 7. The seventh shaft 7 is also connected to the second spur pinion ST2 and the planetary carrier PT3 of the third planetary gear set PR3. The second spur pinion ST2 is further connected to a ninth shaft 9, whereas the ninth shaft 9 is further connectable to the output shaft 2 through the fourth clutch K4. Thereby, the planetary carrier PT3 of the third planetary gear set PR3 is further connected to the planetary carrier PT2 of the second planetary gear set PR2 through the seventh shaft 7. The ring gear H1 of the first planetary gear set PR1 is connected to the first spur pinion ST1 through a sixth shaft 6, whereas the first spur pinion ST1 is further connected to the output shaft 2. The ring gear H3 of the third planetary gear set PR3 is connected to the first brake B1 through an eighth shaft 8. A transfer of the rotational movement between the drive shaft 1 and the output shaft 2 takes place through the first spur pinion ST1 and/or through the second spur pinion ST2. Through the corresponding actuation of the shift elements, different transmission ratios between the drive shaft 1 and output shaft 2 can be realized.

The first planetary gear set PR1, the second planetary gear set PR2 and the third planetary gear set PR3 are each designed as a negative planetary gear set. This means that planetary gears of the planetary carrier PT1 mesh with the sun gear S1 and the ring gear H1 of the first planetary gear set PR1. The same applies to the second planetary gear set PR2 or the sun gear S2, the planetary carrier PT2 and the ring gear H2 of the second planetary gear set PR2 and the third planetary gear set PR3 or the sun gear S3, the planetary carrier PT3 and the ring gear H3 of the third planetary gear set PR3.

In the present embodiment, the first clutch K1, the third clutch K3 and the fourth clutch K4 are particularly easily accessible from the outside, since no additional components and/or connection elements are arranged between the housing G and the specified shift elements.

Figure 2:
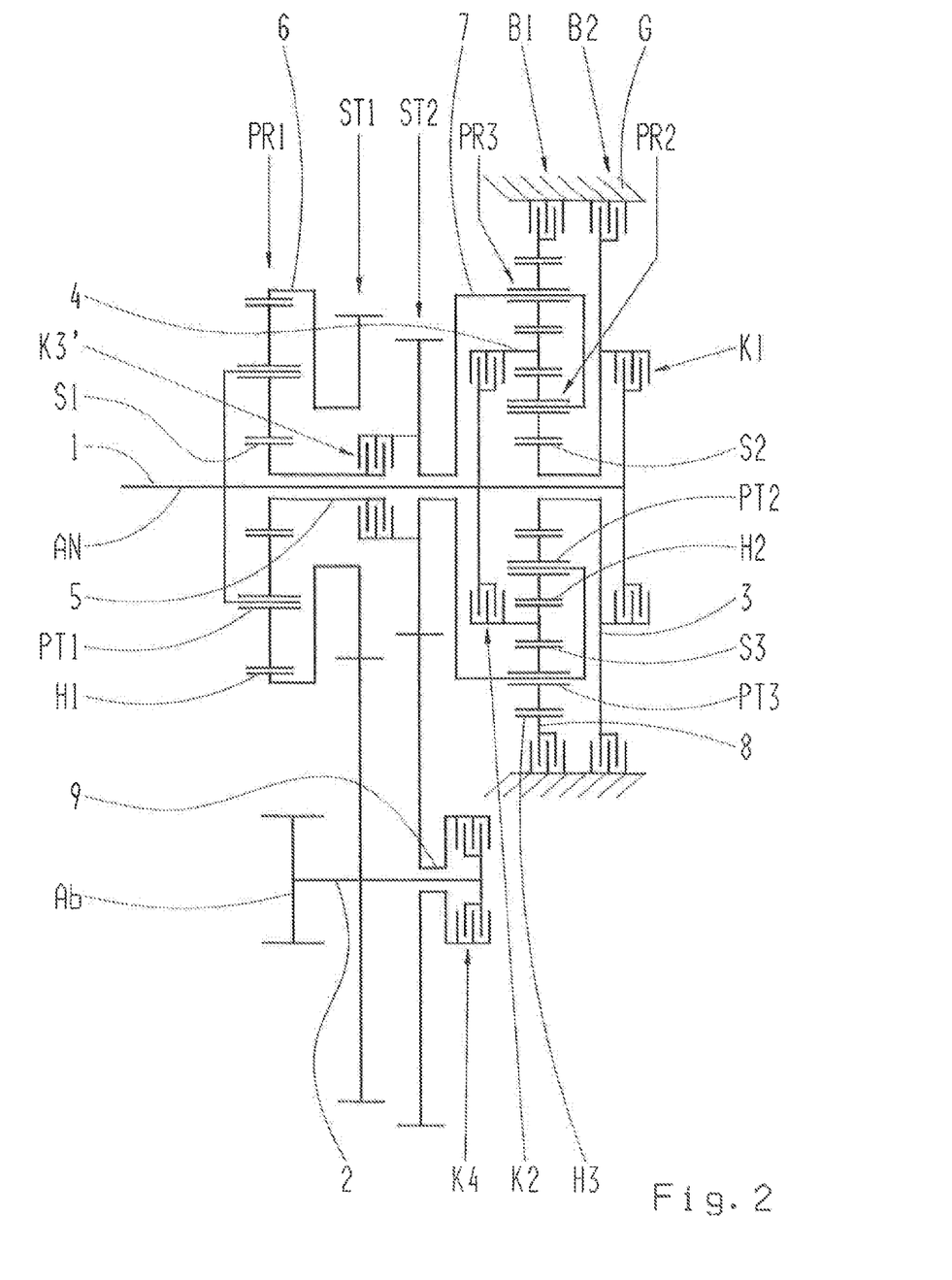
FIG. 2 is a schematic view of a second preferred embodiment of a transmission in accordance with the invention.

FIG. 2 shows an additional embodiment of the transmission described in FIG. 1, which differs from the embodiment described in FIG. 1 primarily by a deviating positioning of the third clutch K3'. In the present example, the third clutch K3' is positioned spatially between the first spur pinion ST1 and the second spur pinion ST2 in coaxial arrangement to the drive shaft 1. Through the arrangement differing from the arrangement described in FIG. 1, changes arise in the interfaces or connections of the individual components, which are described below. Here, the drive shaft 1 is directly connected to the planetary carrier PT1 of the first planetary gear set PR1. The sun gear S1 of the first planetary gear set PR1 is connected to the fifth shaft 5, whereas the fifth shaft 5 is connectable to the seventh shaft 7 through the third clutch K3'. The seventh shaft 7 further connects the second spur pinion ST2 to the planetary carrier PT3 of the third planetary gear set PR3. The second spur pinion ST2 is further connected to the ninth shaft 9, whereas the ninth shaft 9 is connectable to the output shaft 2 through the fourth clutch K4. The planetary carrier PT3 of the third planetary gear set PR3 is connected to the planetary carrier PT2 of the second planetary gear set PR2 through the seventh shaft 7. All additional interfaces, connections and arrangements of the individual elements and components correspond to the arrangement described in FIG. 1.

Figure 3:
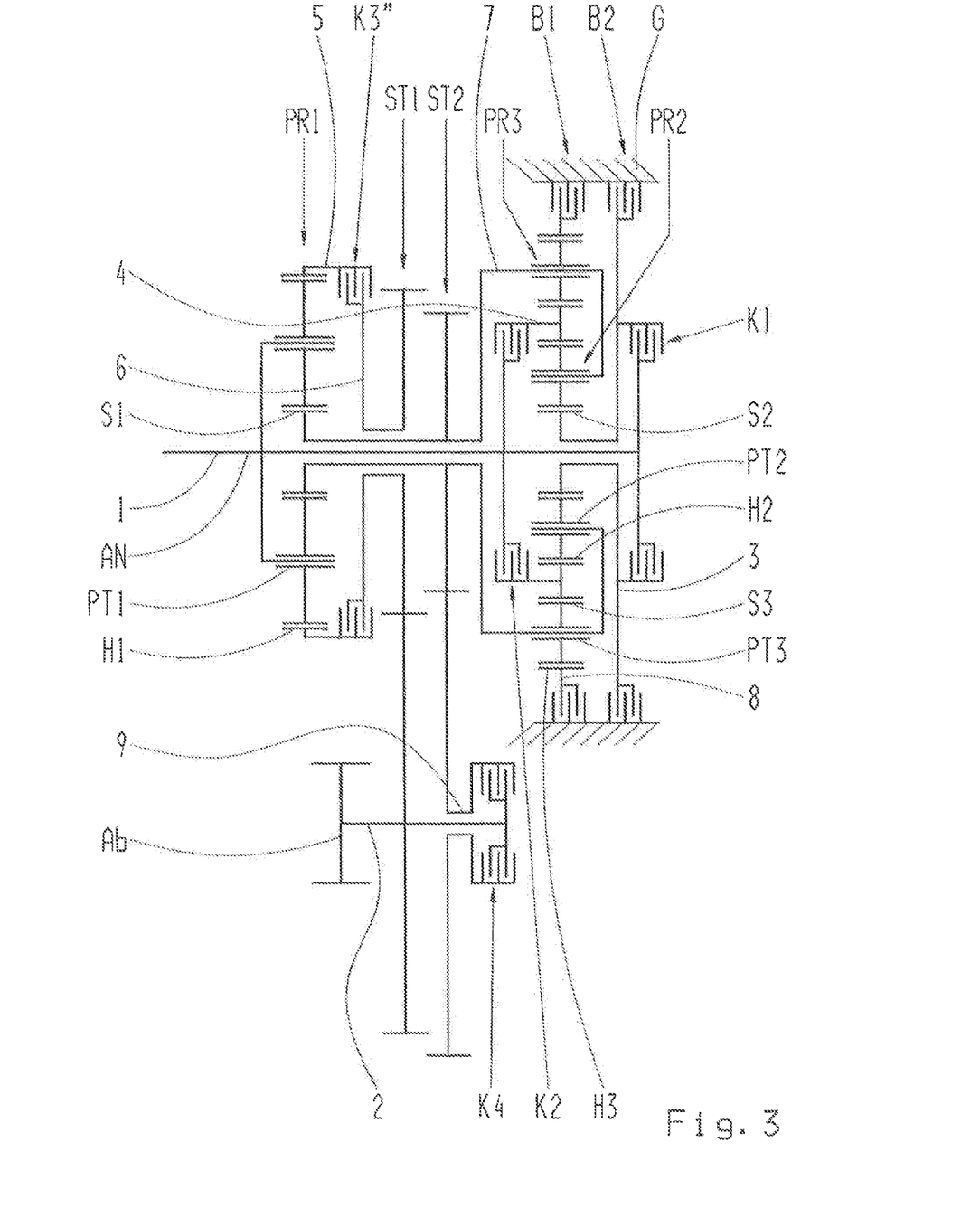
FIG. 3 is a schematic view of a third preferred embodiment of a transmission in accordance with the invention.

FIG. 3 shows an additional embodiment of the transmission described in FIG. 1. This differs from the arrangement described in FIG. 1 in that the third clutch K3" is positioned spatially between the first planetary gear set PR1 and the first spur pinion ST1 in coaxial arrangement to the drive shaft 1. The changes that arise from this with respect to the connections and interfaces are described below. The drive shaft 1 is now directly connected to the planetary carrier PT1 of the first planetary gear set PR1. The ring gear H1 of the first planetary gear set PR1 is connected to the fifth shaft 5, whereas the fifth shaft 5 of the third clutch K3" is connectable to the sixth shaft 6. The sixth shaft 6 is further connected to the first spur pinion ST1, and the first spur pinion ST1 is further connected to the output shaft 2. All additional interfaces, connections and arrangements of the individual elements correspond to the arrangement described in FIG. 1.

Figure 4:
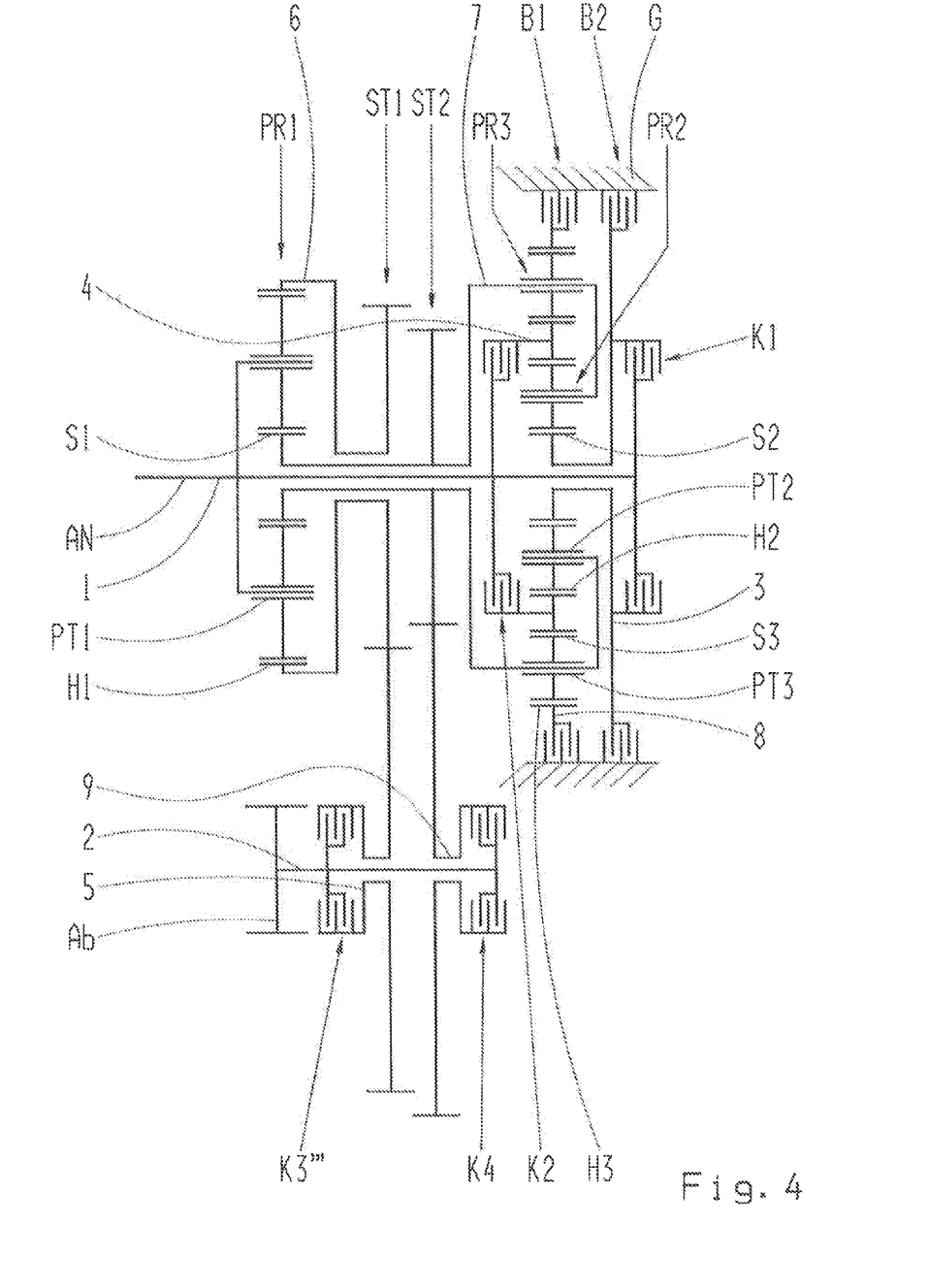
FIG. 4 is a schematic view of a fourth preferred embodiment of a transmission in accordance with the invention.

FIG. 4 shows an additional variant of the transmission described in FIG. 1. A significant difference with the transmission described in FIG. 1 is reflected in the geometric position of the third clutch K3'''. In the present embodiment, the third clutch K3''' is arranged coaxially to the output shaft 2. Thereby, the third clutch K3''', the first spur pinion ST1, the second spur pinion ST2 and the fourth clutch K4 are arranged in the order just specified, beginning at the free end of the output shaft 2. Due to the positioning of the third clutch K3''' that differs when compared to the arrangement described in FIG. 1, differences arise with respect to the interfaces and connections, which are described below. The drive shaft 1 is now directly connected to the planetary carrier PT1 of the first planetary gear set PR1. The ring gear H1 of the first planetary gear set PR1 is connected to the first spur pinion ST1 through the sixth shaft 6, whereas the first spur pinion ST1 is further connected to the fifth shaft 5. The fifth shaft 5 is connectable to the output shaft 2 through the third clutch K3'''. All additional interfaces, connections and arrangements of the individual elements correspond to the arrangement described in FIG. 1.

Figure 5:
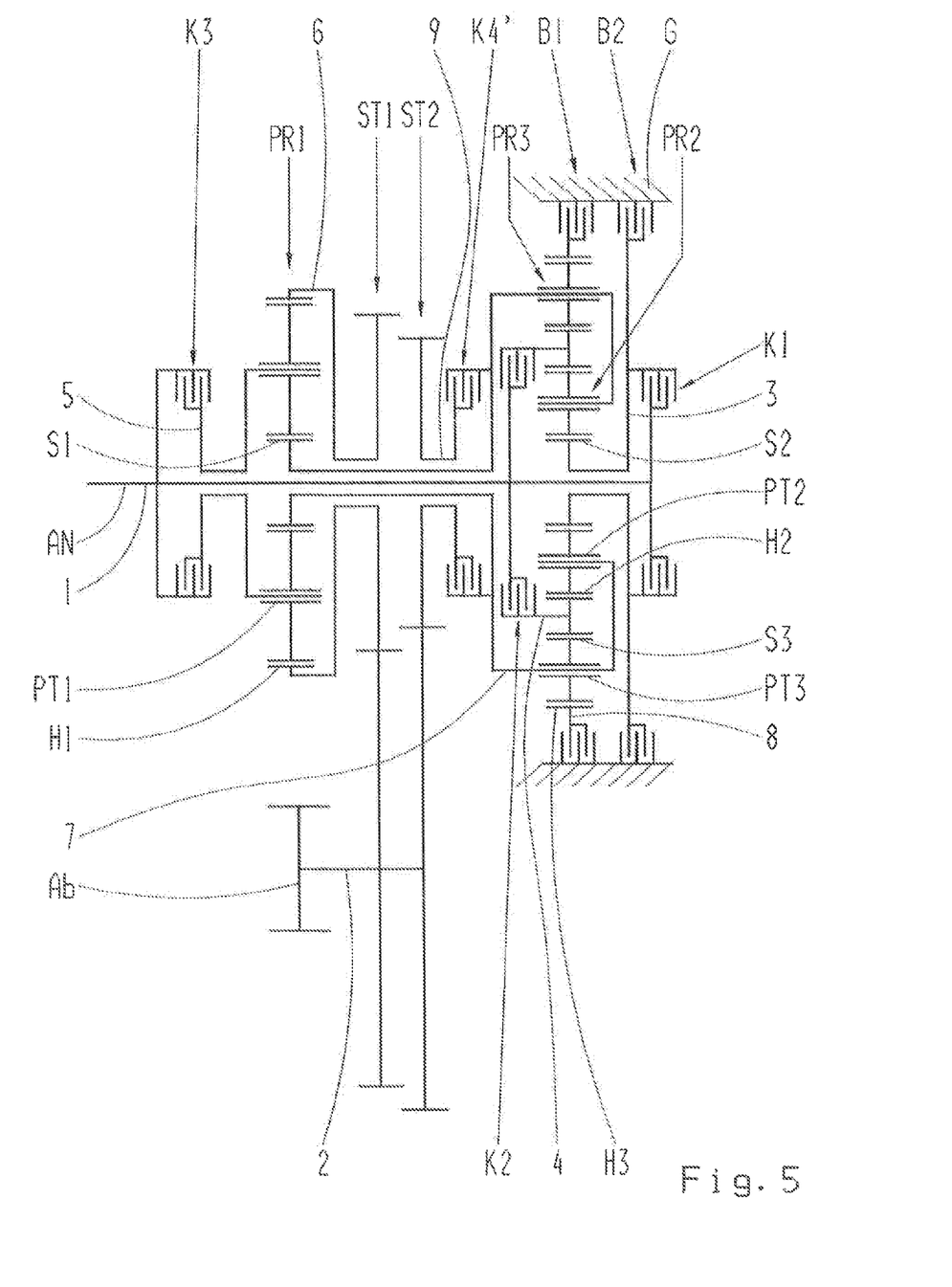
FIG. 5 is a schematic view of a fifth preferred embodiment of a transmission in accordance with the invention.

FIG. 5 shows an additional embodiment of the transmission described in FIG. 1. This differs from the arrangement described in FIG. 1 in that the fourth clutch K4' is positioned spatially in coaxial arrangement to the drive shaft 1 between the second spur pinion ST2 and the second clutch K2. The resulting differences regarding the interfaces and connections in comparison to the arrangement described in FIG. 1 are described below. The sun gear S1 of the first planetary gear set PR1 is connected to the seventh shaft 7. The seventh shaft 7 is also connected to the planetary carrier PT3 of the third planetary gear set PR3, and is connectable to the ninth shaft 9 through the fourth clutch K4'. The ninth shaft 9 is also connected to the second spur pinion ST2, whereas the second spur pinion ST2 is further connected to the output shaft 2. The planetary carrier PT3 of the third planetary gear set PR3 is further connected to the planetary carrier PT2 of the second planetary gear set PR2 through the seventh shaft 7. All additional interfaces, connections and arrangements of the individual elements correspond to the arrangement described in FIG. 1.

Figure 6:
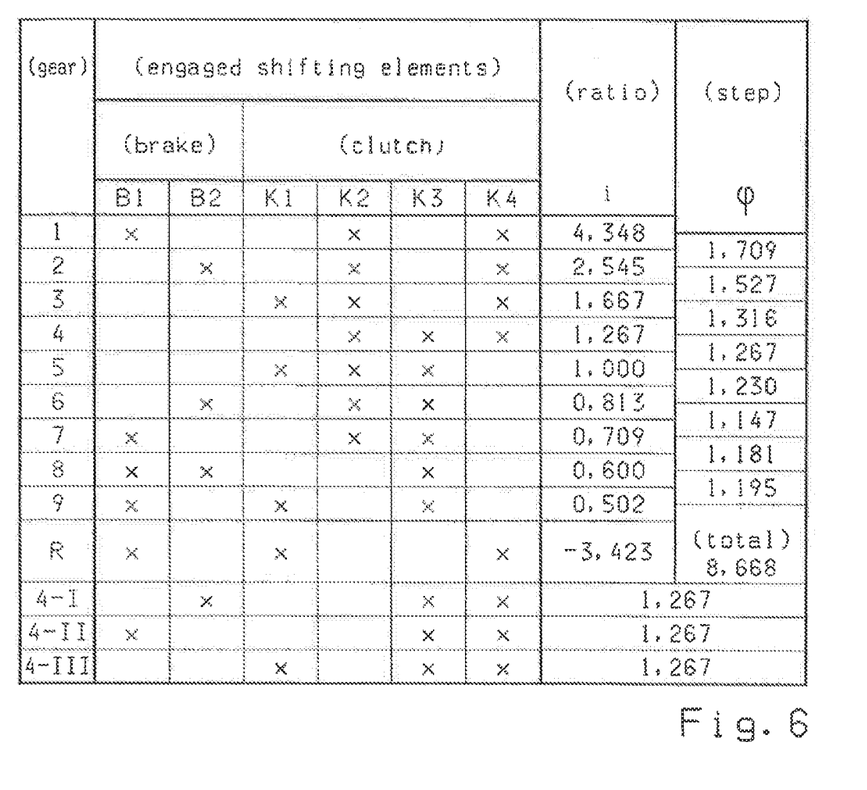
FIG. 6 is an exemplary shift diagram for a transmission in accordance with FIGS. 1 to 5.

In a table, FIG. 6 shows a shifting matrix of the transmission in accordance with the invention. By means of an X in the corresponding box, the shift element that is locked for the realization of the first to ninth forward gear and the reverse gear is made clear. In addition, three shifting alternatives for the fourth forward gear are indicated with the numbers 4-I, 4-II and 4-III.

The shifting states of the alternative embodiments of the third clutch K3', K3", K3''' are identical to the shifting states of the third clutch K3. The same applies to the shifting states of the alternative embodiment of the fourth clutch K4' and the shifting states of the fourth clutch K4. This means that, for example, the shifting states of the alternative embodiments of the third clutch K3', K3", K3''' are defined in the table, for example, through the shifting state of the third clutch K3.

Furthermore, the transmission ratio of the respective gear is specified, whereas the first forward gear features a transmission ratio of i=4.348, the second forward gear features a transmission ratio of i=2.545, the third forward gear features a transmission ratio of i=1.667, the fourth forward gear features a transmission ratio of i=1.267, the fifth forward gear features a transmission ratio of i=1.000, the sixth forward gear features a transmission ratio of i=0.813, the seventh forward gear features a transmission ratio of i=0.709, the eighth forward gear features a transmission ratio of i=0.600 and the ninth forward gear features a transmission ratio of i=0.502. Given the reversal of direction of the rotational movement, the reverse gear features a negative transmission ratio of i=−3.423. Here, "transmission ratio" and "transmission ratio" are synonymous.

The corresponding gear jumps of the forward gears can also be derived from the table. Under "gear jump," the quotient of the transmission ratios of the lower forward gear and the adjacent higher forward gear is understood. Thereby, the gear jump from the first forward gear to the second forward gear has a value of φ=1.709, the gear jump from the second forward gear to the third forward gear has a value of φ=1.527, the gear jump from the third forward gear to the fourth forward gear has a value of φ=1.316, the gear jump from the fourth forward gear to the fifth forward gear has a value of φ=1.267, the gear jump from the fifth forward gear to the sixth forward gear has a value of φ=1.230, the gear jump from the sixth forward gear to the seventh forward gear has a value of φ=1.147, the gear jump from the seventh forward gear to the eighth forward gear has a value of φ=1.181 and the gear jump from the eighth forward gear to the ninth forward gear has a value of φ=1.195.

The gear spread, as a quotient of the transmission ratio of the lowest forward gear and the transmission ratio of the highest forward gear, amounts to 8.658.

Modifications and variations can be made to the embodiments illustrated or described herein without departing from the scope and spirit of the invention as set forth in the appended claims.

The invention claimed is:

1. A transmission for a motor vehicle, the transmission comprising:
    a drive shaft (1);
    an output shaft (2);
    a housing (G);
    a first planetary gear set (PR1), a second planetary gear set (PR2) and a third planetary gear set (PR3), wherein each planetary gear set (PRI, PR2, PR3) comprises a sun gear (S1, S2, S3), a planetary gear, a planetary carrier (PT1, PT2, PT3), and a ring gear (H1, H2, H3);
    six shift elements in the form of a first brake (B1), a second brake (B2), a first clutch (K1), a second clutch (K2), a third clutch (K3, K3', K3", K3''') and a fourth clutch (K4, K4'), wherein the shift elements are selectively actuated to provide nine forward gears and one reverse gear through different transmission ratios between the drive shaft (1) and the output shaft (2);
    the drive shaft (1) and the output shaft (2) arranged in a manner axially offset to each other;
    the drive shaft (1), through the second clutch (K2), connectable to the ring gear (H2) of the second planetary gear set (PR2) and the sun gear (S3) of the third planetary gear set (PR3);
    the drive shaft (1), through the first clutch (K1), connectable to the second brake (B2) and the sun gear (S2) of the second planetary gear set (PR2); and
    the sun gear (S2) of the second planetary gear set (PR2) and the second brake (B2) connected to each other.

2. The transmission according to claim 1, wherein the ring gear (H3) of the third planetary gear set (PR3) is connected to the first brake (B1).

3. The transmission according to claim 1, wherein a torque is transferable between the drive shaft (1) and the output shaft (2) through one or both of a first spur pinion (ST1) and a second spur pinion (ST2).

4. The transmission according to claim 3, wherein the first spur pinion (ST1) and the second spur pinion (ST2) are arranged in an axial alignment along the drive shaft (1) between the first planetary gear set (PR1) and the second planetary gear set (PR2), in the order of first planetary gear set (PR1), first spur pinion (ST1), second spur pinion (ST2), second planetary gear set (PR2).

5. The transmission according to claim 1, wherein the second planetary gear set (PR2) and the third planetary gear set (PR3) are axially positioned with respect to the drive shaft (1) such that the third planetary gear set (PR3) is arranged radially over the second planetary gear set (PR2) and the ring gear (H2) of the second planetary gear set (PR2) is connected to the sun gear (S3) of the third planetary gear set (PR3).

6. The transmission according to claim 1, wherein the first clutch (K1) and the second clutch (K2) are each connected to the drive shaft (1).

7. The transmission according to claim 1, wherein the first planetary gear set (PR1), the second planetary gear set (PR2) and the third planetary gear set (PR3) are each designed as a negative planetary gear set.

8. The transmission according to claim 1, wherein:
(a) the drive shaft (1) is connectable to the planetary carrier (PT1) of the first planetary gear set (PR1) through the third clutch (K3);
(b) the sun gear (S1) of the first planetary gear set (PR1) is connected to a second spur pinion (ST2) and the planetary carrier (PT3) of the third planetary gear set (PR3);
(c) the second spur pinion (ST2) is further connectable to the output shaft (2) through the fourth clutch (K4);
(d) the planetary carrier (PT3) of the third planetary gear set (PR3) is further connected to the planetary carrier (PT2) of the second planetary gear set (PR2);
(e) the ring gear (H1) of the first planetary gear set (PRI) is connected to a first spur pinion (STI); and
(f) the first spur pinion (ST1) is further connected to the output shaft (2).

9. The transmission according to claim 1, wherein:
(a) the drive shaft (1) is connected to the planetary carrier (PT1) of the first planetary gear set (PR1);
(b) the sun gear (S1) of the first planetary gear set (PR1) is connectable to a second spur pinion (ST2) and the planetary carrier (PT3) of the third planetary gear set (PR3) through the third clutch (K3');
(c) the second spur pinion (ST2) is further connectable to the output shaft (2) through the fourth clutch (K4);
(d) the planetary carrier (PT3) of the third planetary gear set (PR3) is further connected to the planetary carrier (PT2) of the second planetary gear set (PR2);
(e) the ring gear (H1) of the first planetary gear set (PR1) is connected to a first spur pinion (ST1) through the third clutch (K"); and
(f) the first spur pinion (ST1) is further connected to the output shaft (2).

10. The transmission according to claim 1, wherein:
(a) the drive shaft (1) is connected to the planetary carrier (PT1) of the first planetary gear set (PR1);
(b) the sun gear (S1) of the first planetary gear set (PR1) is connected to a second spur pinion (ST2) and the planetary carrier (PT3) of the third planetary gear set (PR3);
(c) the second spur pinion (ST2) is further connectable to the output shaft (2) through the fourth clutch (K4);
(d) the planetary carrier (PT3) of the third planetary gear set (PR3) is further connected to the planetary carrier (PT2) of the second planetary gear set (PR2);
(e) the ring gear (H1) of the first planetary gear set (PR1) is connectable to a first spur pinion (ST1) through the third clutch (K3"); and
(f) the first spur pinion (ST1) is further connected to the output shaft (2).

11. The transmission according to claim 1, wherein:
(a) the drive shaft (1) is connected to the planetary carrier (PT1) of the first planetary gear set (PR1);
(b) the sun gear (S1) of the first planetary gear set (PR1) is connected to a second spur pinion (ST2) and the planetary carrier (PT3) of the third planetary gear set (PR3);
(c) the second spur pinion (ST2) is further connectable to the output shaft (2) through the fourth clutch (K4);
(d) the planetary carrier (PT3) of the third planetary gear set (PR3) is further connected to the planetary carrier (PT2) of the second planetary gear set (PR2);
(e) the ring gear (H1) of the first planetary gear set (PR1) is connected to a first spur pinion (ST1); and
(f) the first spur pinion (ST1) is connectable to the output shaft (2) through the third clutch (K3''').

12. The transmission according to claim 1, wherein:
(a) the drive shaft (1) is connectable to the planetary carrier (PT1) of the first planetary gear set (PR1) through the third clutch (K3);
(b) the sun gear (S1) of the first planetary gear set (PR1) is connected to the planetary carrier (PT3) of the third planetary gear set (PR3) and is connectable to a second spur pinion (ST2) through the fourth clutch (K4');
(c) the planetary carrier (PT3) of the third planetary gear set (PR3) is further connected to the planetary carrier (PT2) of the second planetary gear set (PR2);
(d) the second spur pinion (ST2) is further connected to the output shaft (2);
(e) the ring gear (H1) of the first planetary gear set (PR1) is connected to a first spur pinion (ST1); and
(f) the first spur pinion (ST1) is further connected to the output shaft (2).

13. The transmission according to claim 1, wherein:
(a) the first forward gear is represented by the locked first brake (B1), the locked second clutch (K2) and the locked fourth clutch (K4, K4');
(b) the second forward gear is represented by the locked second brake (B2), the locked second clutch (K2) and the locked fourth clutch (K4, K4');
(c) the third forward gear is represented by the locked first clutch (K1), the locked second clutch (K2) and the locked fourth clutch (K4, K4');
(d) the fourth forward gear is represented by one of:
(1) the locked second clutch (K2), the locked third clutch (K3, K3', K3", K3''') and the locked fourth clutch (K4, K4');
(2) the locked second brake (B2), the locked third clutch (K3, K3', K3", K3''') and the locked fourth clutch (K4, K4');
(3) the locked first brake (B1), the locked third clutch (K3, K3', K3", K3''') and the locked fourth clutch (K4, K4');
(4) the locked first clutch (K1), the locked third clutch (K3, K3', K3", K3''') and the locked fourth clutch (K4, K4');
(e) the fifth forward gear is represented by the locked first clutch (K1), the locked second clutch (K2) and the locked third clutch (K3, K3', K3", K3''');
(f) the sixth forward gear is represented by the locked second brake (B2), the locked second clutch (K2) and the locked third clutch (K3, K3', K3", K3");
(g) the seventh forward gear is represented by the locked first brake (B1), the locked second clutch (K2) and the locked third clutch (K3, K3', K3", K3''');
(h) the eighth forward gear is represented by the locked first brake (B1), the locked second brake (B2) and the locked third clutch (K3, K3', K3", K3''');

(i) the ninth forward gear is represented by the locked first brake (B1), the locked first clutch (K1) and the locked third clutch (K3, K3', K3", K3'");

(j) the reverse gear can be represented by the locked first brake (B1), the locked first clutch (K1) and the locked fourth clutch (K4, K4').

14. A method for operating the transmission according to claim 1, comprising selecting the nine forward gears in such a manner that, in each forward gear, three shift elements are locked and the remaining shift elements are open, and for a gear change to an adjacent higher gear or to an adjacent lower gear, closing at least one previously open shift element and by opening at least one previously locked shift element.

* * * * *